US011991496B2

(12) United States Patent
Ji et al.

(10) Patent No.: US 11,991,496 B2
(45) Date of Patent: May 21, 2024

(54) DISPLAY PANEL, DISPLAY DEVICE, FABRICATING METHOD AND CONTROL METHOD OF DISPLAY PANEL

(71) Applicant: BOE Technology Group Co., Ltd., Beijing (CN)

(72) Inventors: Yaqian Ji, Beijing (CN); Xue Dong, Beijing (CN); Wei Sun, Beijing (CN); Yingming Liu, Beijing (CN); Wenchao Han, Beijing (CN); Xiaoliang Ding, Beijing (CN); Xiufeng Li, Beijing (CN); Yanling Han, Beijing (CN); Lianghao Zhang, Beijing (CN); Chenyang Zhang, Beijing (CN); Yuzhen Guo, Beijing (CN); Peixiao Li, Beijing (CN); Yue Gou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 135 days.

(21) Appl. No.: 17/765,200

(22) PCT Filed: May 20, 2021

(86) PCT No.: PCT/CN2021/094905
§ 371 (c)(1),
(2) Date: Mar. 30, 2022

(87) PCT Pub. No.: WO2021/238768
PCT Pub. Date: Dec. 2, 2021

(65) Prior Publication Data

US 2022/0386019 A1 Dec. 1, 2022

(30) Foreign Application Priority Data

May 26, 2020 (CN) ........................ 202010456438.6

(51) Int. Cl.
*H04R 1/24* (2006.01)
*H04R 1/02* (2006.01)
(Continued)

(52) U.S. Cl.
CPC ............... *H04R 1/24* (2013.01); *H04R 1/028* (2013.01); *H04R 3/12* (2013.01); *H04R 7/04* (2013.01);
(Continued)

(58) Field of Classification Search
CPC . H04R 1/24; H04R 1/028; H04R 3/12; H04R 7/04; H04R 7/18; H04R 9/06; H04R 31/0003
(Continued)

(56) References Cited

U.S. PATENT DOCUMENTS

2020/0348796 A1* 11/2020 Chou ................ G06V 40/1306

FOREIGN PATENT DOCUMENTS

CN 103416043 A 11/2013
CN 105096778 A 11/2015
(Continued)

OTHER PUBLICATIONS

First Office Action dated Jan. 19, 2021 for application No. CN202010456438.6 with English translation attached.
(Continued)

*Primary Examiner* — Thjuan K Addy
(74) *Attorney, Agent, or Firm* — Nath, Goldberg & Meyer; Joshua B. Goldberg

(57) ABSTRACT

A display panel, a fabricating method and a control method thereof and a display device are provided. Display panel includes a display assembly and sound generation assemblies. Display assembly includes a display assembly substrate and pixel components disposed on a side of display assembly substrate. Each sound generation assembly
(Continued)

includes a vibrating membrane, an exciter, and a support structure. Support structure is disposed on a side of vibrating membrane and has a cavity. Exciter includes a motion part in contact with vibrating membrane and a drive part disposed in cavity. Drive part drives motion part to vibrate, and motion part vibrates to drive vibrating membrane to vibrate. Display assembly substrate and vibrating membrane are the same structure, and pixel components are disposed on a side of vibrating membrane facing away from support structure. Display device includes the display panel above.

20 Claims, 7 Drawing Sheets

(51) Int. Cl.

| | |
|---|---|
| ***H04R 3/12*** | (2006.01) |
| ***H04R 7/04*** | (2006.01) |
| ***H04R 7/18*** | (2006.01) |
| ***H04R 9/02*** | (2006.01) |
| ***H04R 9/06*** | (2006.01) |
| ***H04R 31/00*** | (2006.01) |

(52) U.S. Cl.
CPC ............... *H04R 7/18* (2013.01); *H04R 9/025* (2013.01); *H04R 9/06* (2013.01); *H04R 31/003* (2013.01); *H04R 2499/15* (2013.01)

(58) Field of Classification Search
USPC .................. 381/333, 87, 301, 306, 388, 332
See application file for complete search history.

(56) References Cited

FOREIGN PATENT DOCUMENTS

| | | | |
|---|---|---|---|
| CN | 109068249 | A | 12/2018 |
| CN | 110366077 | A | 10/2019 |
| CN | 110401905 | A | 11/2019 |
| CN | 110572758 | A | 12/2019 |
| CN | 110660318 | A | 1/2020 |
| CN | 111491242 | A | 8/2020 |
| EP | 2821844 | A1 | 1/2015 |
| EP | 2821844 | B1 | 4/2018 |

OTHER PUBLICATIONS

Second Office Action dated Aug. 5, 2021 for application No. CN202010456438.6 with English translation attached.
Decision of Rejection dated Nov. 1, 2021 for application No. CN202010456438.6 with English translation attached.
Notice of Review dated Jun. 8, 2022 for application No. CN202010456438.6 with English translation attached.
Review of the Decision to Rejection dated Aug. 30, 2022 for application No. CN202010456438.6 with English translation attached.

* cited by examiner

DISPLAY PANEL, DISPLAY DEVICE, FABRICATING METHOD AND CONTROL METHOD OF DISPLAY PANEL

CROSS-REFERENCE TO RELATED APPLICATIONS

The present application claims the priority of the Chinese patent application. No. 202010456438.6 filed with the China National Intellectual Property Administration (CNIPA) on May 26, 2020, the disclosure of which is incorporated herein by reference.

TECHNICAL FIELD

The present disclosure relates to the technical field of display, in particular to a display panel, a display device and a fabricating method and a control method of the display panel.

BACKGROUND

With the development of science and technology, sound generation units are required to be disposed in various electronic devices. In the existing technology, the sound generation unit is usually disposed under a panel of a display panel. If a good sound generation effect is desired, the volume of the sound generation unit would be large, which would occupy a large space. If the volume of the sound generation unit is too small, a good sound generation effect cannot be achieved. Further, the sound generation unit is generally disposed in a corner and/or edge region of the display panel, thus the sound generation position is fixed, and a user cannot obtain a good hearing experience.

SUMMARY

The technical solutions of the embodiments of the present disclosure relate to a display panel, including: a display assembly and a plurality of sound generation assemblies:

the display assembly comprises a display assembly substrate and a plurality of pixel components disposed on a side of the display assembly substrate;

each of the plurality of sound generation assemblies comprises a vibrating membrane, an exciter and a support structure;

the support structure is disposed on a side of the vibrating membrane and has a cavity;

the exciter comprises a motion part in contact with the vibrating membrane and a drive part disposed in the cavity, the drive part drives the motion part to vibrate, and the motion part vibrates to drive the vibrating membrane to vibrate; wherein, the display assembly substrate and the vibrating membrane are the same structure, and the plurality of pixel components are disposed on a side of the vibrating membrane facing away from the support structure.

Optionally, a partial region of the vibrating membrane is a rigid substrate, and a remaining partial region of the vibrating membrane is a flexible substrate.

Optionally, the vibrating membrane includes a flexible substrate layer and an additional layer; wherein, the additional layer is disposed on a side of the flexible substrate layer close to the support structure, and when viewed in a direction from the vibrating membrane to the support structure, a projection of the additional layer on the flexible substrate layer is positioned within a projection of the cavity on the flexible substrate layer; and a rigidity of the additional layer is not less than a rigidity of the flexible substrate layer, and the partial region of the vibrating membrane is configured such that the additional layer and a portion of the flexible substrate layer corresponding to the additional layer together form the rigid substrate.

Optionally, the additional layer is integrally formed with the flexible substrate layer; or the additional layer is integrally formed with the support structure.

Optionally, the vibrating membrane is a flexible substrate; or the vibrating membrane is a rigid substrate.

Optionally, the support structure includes a rigid support structure and an elastic support structure, wherein the elastic support structure is disposed on a side of the rigid support structure close to the vibrating membrane.

Optionally, the drive part is a magnet, the motion part is a voice coil disposed on a side of the vibrating membrane close to the magnet, and the voice coil is disposed in the cavity.

Optionally, the drive part is a voice coil, the motion part is a magnetic film disposed between the vibrating membrane and the support structure, and the magnetic film covers the cavity.

Optionally, in the plurality of pixel units, a gap is formed between two adjacent pixel units; and the drive part is a voice coil, and the motion part includes a plurality of magnetic films each disposed in the gap.

Optionally, the plurality of sound generation assemblies include at least one high-frequency sound generation assembly and at least one low-frequency sound generation assembly, and a frequency of an audio corresponding to the high-frequency sound generation assembly is higher than a frequency of an audio corresponding to the low-frequency sound generation assembly; and the number of the high-frequency sound generation assembly is larger than the number of the low-frequency sound generation assembly.

Optionally, the vibrating membrane of the high-frequency sound generation assembly is a rigid substrate, and the vibrating membrane of the low-frequency sound generation assembly is a flexible substrate.

Optionally, when viewed in the direction from the vibrating membrane to the support structure, an area of a projection of the cavity of the low-frequency sound generation assembly on the vibrating membrane is larger than an area of a projection of the cavity of the high-frequency sound generation assembly on the vibrating membrane.

Optionally, the display panel includes a plurality of sound generation regions each provided with a plurality of sound generation assemblies, and each of the plurality of sound generation assemblies in each of the plurality of sound generation regions includes at least one of the high-frequency sound generation assembly and the low-frequency sound generation assembly.

Optionally, the display panel further includes an audio input control chip;

each of the plurality of sound generation regions is connected to a region control chip, and each of the plurality of sound generation assemblies is connected to a sound generation assembly control chip; in each of the plurality of sound generation regions, the sound generation assembly control chip corresponding to each of the plurality of sound generation assemblies is connected to the region control chip of said sound generation region;

the region control chip corresponding to each of the plurality of sound generation regions is connected to the audio input control chip; and the audio input control chip inputs an audio signal into the region control chip corresponding to the sound generation region that is to generate a sound, and after the region control chip processes the audio signal according to a type of the sound generation assembly, the region control chip inputs a processed audio signal into a sound generation assembly control chip of a corresponding sound generation assembly.

Optionally, the display panel further includes a base plate on which a plurality of the sound generation assemblies are arranged linearly or in a cross-shaped array.

Correspondingly, the present disclosure also provides a display device including the above display panel.

Correspondingly, the present disclosure further provides a method for fabricating a display panel, including:

fabricating a vibrating membrane on a side of a support structure through a spin coating process;

processing the vibrating membrane to fabricate the vibrating membrane as a display assembly substrate;

transferring a plurality of pixel components on a side of the vibrating membrane facing away from the support structure;

depositing mask material on a side of a material layer of the support structure facing away from the vibrating membrane, and photoetching the mask material according to a pattern of a cavity to form a mask layer;

performing deep etching processing on the material layer of the support structure from a side of the support structure facing away from the vibrating membrane, so as to form the support structure and a cavity of the support structure; and disposing an exciter including a drive part and a motion part such that the drive part is disposed in the cavity, the motion part is in contact with the vibrating membrane, the drive part drives the motion part to vibrate, and the motion part vibrates to drive the vibrating membrane to vibrate.

Optionally, the method includes, before fabricating the vibrating membrane on the support structure, depositing sacrificial layer material on the material layer of the support structure and performing photoetching to form a sacrificial layer; and after processing the material layer of the support structure to form the cavity, performing deep etching to release the sacrificial layer, so that the vibrating membrane forms a flexible substrate layer and an additional layer, the additional layer is positioned on a side of the flexible substrate layer close to the support structure, wherein the motion part is attached to a side of the additional layer facing away from the flexible substrate layer.

Optionally, in the step of forming the mask layer, the mask material is photoetched according to a pattern of the cavity and the additional layer, and in the step of forming the support structure and the cavity of the support structure, a material layer of the support structure is first deep etched through a mask layer, so that the material layer of the support structure is divided into the support structure positioned at an edge and a middle portion in which the additional layer is to be formed, then the mask layer on the middle portion of the material layer of the support structure is removed by photoetching, and then the middle portion of the material layer of the support structure is subjected to deep photoetching to reduce a thickness until the additional layer and the cavity are formed in the middle portion of the material layer of the support structure, and wherein the motion part is attached to a side of the additional layer facing away from the vibrating membrane.

Correspondingly, the present disclosure also provides a control method of a display panel for controlling the display panel described above; wherein, the control method includes:

inputting, by the audio input control chip, an audio signal into the region control chip corresponding to the sound generation region that is to generate a sound;

and after the audio signal is processed, inputting, by the region control chip, a processed audio signal into a sound generation assembly control chip of a corresponding sound generation assembly.

DETAIL DESCRIPTION OF EMBODIMENTS

Figure 1:
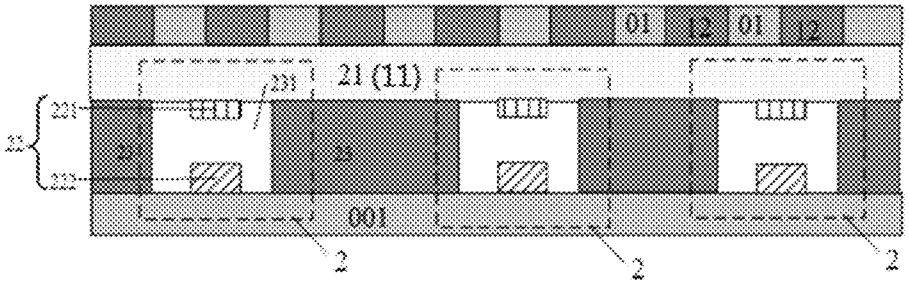
FIG. 1 is a schematic structural diagram of an embodiment of a display panel according to an embodiment of the present disclosure.

To make the objects, technical solutions and advantages of the present disclosure more clear, the present disclosure will be described in detail optionally with reference to the accompanying drawings. It is to be understood that the described embodiments are not all but only a few embodiments of the present disclosure. All other embodiments, which can be derived by a person skilled in the art from the embodiments disclosed herein without making any creative effort, shall fall within the protection scope of the present disclosure.

The shapes and sizes of the components in the drawings are not to scale, but are merely intended to facilitate an understanding of the contents of the embodiments of the present disclosure.

Unless defined otherwise, the technical or scientific terms used herein shall have the ordinary meaning as understood by one of ordinary skill in the art to which this disclosure belongs. The use of the wording "first", "second", and the like in this disclosure is not intended to indicate any order, quantity, or importance, but rather is used to distinguish one component from other components. Also, the use of the wording "a", "an", or "the" and the like do not denote a limitation of quantity, but rather denote the presence of at least one. The wording "comprising", "including", or the like, means that the element or item preceding the word comprises the element or item listed after the word and its equivalent, but does not exclude other elements or items. The wording "connected" or "coupled" and the like are not restricted to physical or mechanical connections, but may include electrical connections, whether direct or indirect. The wording "upper", "lower", "left", "right", and the like are used only to indicate relative positional relationships, and when the absolute position of the object being described is changed, the relative positional relationships may also be changed accordingly. The wording "orthographic projection" and the like refer to a projection viewed in a top-to-bottom direction in FIG. 1 (e.g., in a direction from the vibrating membrane to the support structure).

As shown in FIG. 1, this embodiment provides a display panel including a display assembly 1 and a plurality of sound generation units 2.

Figure 2:
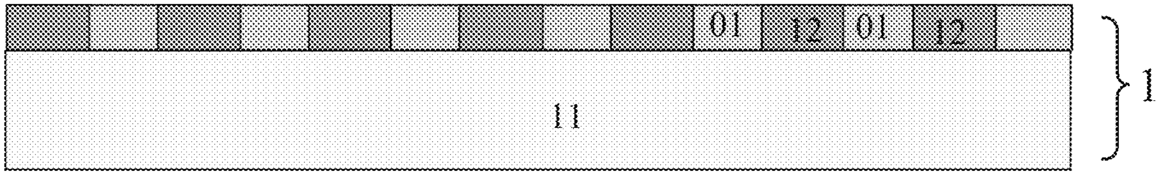
FIG. 2 is a schematic structural diagram of a panel of a display panel according to an embodiment of the disclosure.
Figure 3:
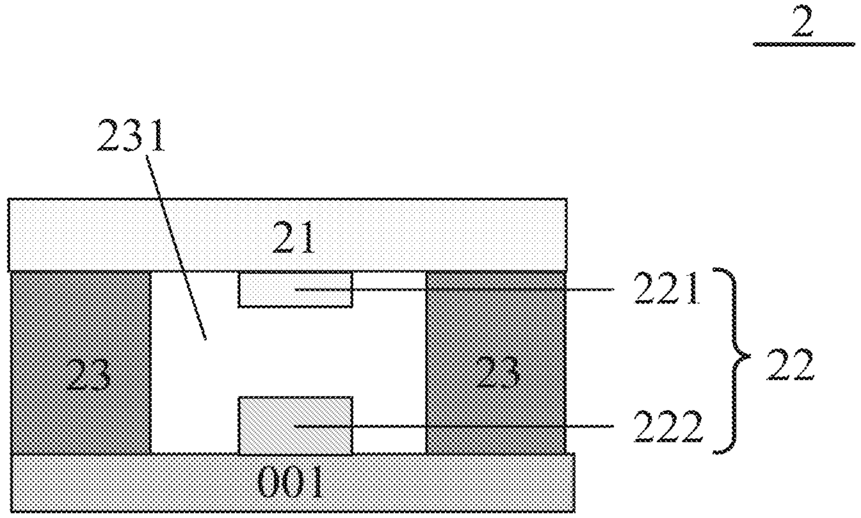
FIG. 3 is a schematic structural diagram of a sound generation unit of a display panel according to an embodiment of the present disclosure.

Specifically, referring to FIG. 2, the display assembly 1 includes a display assembly substrate 11 and a plurality of pixel units 12 disposed on a side of the display assembly substrate 11. In FIG. 2, the pixel units 12 are disposed on the display assembly 11. A gap 01 is formed between adjacent pixel units 12. Referring to FIG. 3, in the plurality of sound generation units 2, each sound generation unit 2 includes a vibrating membrane 21, an exciter 22, and a support structure 23. The support structure 23 is disposed at a side of the vibrating membrane 21 and configured to support the vibrating membrane 21. The support structure 23 has a cavity 231, and the vibrating membrane 21 covers the cavity 231 to form a suspended membrane structure of the sound generation unit. The cavity 231 can increase a space for accommodating the exciter 22 while providing a space for the vibrating membrane 21 to bend and vibrate. The exciter 22 includes a motion part 221 and a drive part 222. The drive part 222 is disposed in the cavity 231, the motion part 221 is in contact with the vibrating membrane 21 of the sound generation unit 2, and the drive part 222 drives the motion part 221 to vibrate. Since the motion part 221 is in contact with the vibrating membrane 21, the vibrating membrane 21 can be driven to vibrate by driving the motion part 221 to vibrate, so that a sound is generated. Referring to FIG. 1, the display assembly substrate 11 and the vibrating membrane 21 are the same structure. In other words, in this embodiment the vibrating membrane 21 simultaneously serves as the display assembly substrate 11 of the plurality of pixel units 12, and the plurality of pixel units 12 are disposed on a side of the vibrating membrane 21 facing away from the support structure 23. It should be noted that the contact between the motion part 221 and the vibrating membrane 21 may be direct contact or indirect contact. Direct contact indicates that there is no other medium between the motion part 221 and the vibrating membrane 21. Indirect contact indicates that other medium is disposed between the motion part 221 and the vibrating membrane 21 for transmission. For example, in the embodiments described below, an additional layer, an etch stop layer, and the like may be present between the motion part 221 and the vibrating membrane 21, and these media would not affect the vibration of the motion part 221 to drive the vibrating membrane 21 to vibrate, thus are not limited herein.

Optionally, by arranging wires for the pixel units 12 on the vibrating membrane 21, the vibrating membrane 21 may be served as the display assembly substrate 11 of a plurality of pixel units 12.

Optionally, the pixel units 12 may be LED components, and the wires disposed on the vibrating membrane 21 may be LED wires.

In the display panel according to this embodiment, since the vibrating membrane 21 of the sound generation unit 2 and the display assembly substrate 11 of the display assembly 1 are the same structure, that is, the vibrating membrane 21 serves as the display assembly substrate 11 of the pixel units 12, a plurality of pixel units 12 are disposed above the vibrating membrane 21. When the sound generation unit 2 generates a sound, the vibrating membrane 21 and the pixel units 12 vibrate to generate a sound under the drive of the exciter 22. In other words, the vibrating membrane 21 and the plurality of pixel units 12 together form a vibrating membrane layer of the sound generation unit 2, so that the sound generation unit 2 and the display assembly 1 can be integrated to reduce a space occupied by the sound generation unit 2, and the display panel can be thinned. In addition, since a plurality of pixel units 12 are disposed on the vibrating membrane 21, the plurality of pixel units 12 and the vibrating membrane 21 together form a vibrating membrane layer. The plurality of pixel units 12 may also vibrate under the drive of the exciter 22, so that the display panel can realize sound generation from the screen.

It should be noted that the display panel according to this embodiment may further include a base plate 001 on which the sound generation units 2 are disposed. In other words, a side of the sound generation unit 2 facing away from the display assembly 1 is disposed on the base plate 001. A pixel driving circuit and a sound generation unit driving circuit may be disposed on the base plate 001. The pixel driving circuit is connected to a plurality of pixel units 12, and the sound generation unit driving circuit is connected to a plurality of sound generation units 2.

Optionally, an orthographic projection of the cavity 231 on the vibrating membrane 21 may be circular to reduce stress of the vibrating membrane against an inner wall of the cavity when the vibrating membrane 21 vibrates. Of course, the cavity 231 may have other shape, which is not limited herein.

Optionally, in fabricating the display panel, the vibrating membrane 21 may be first fabricated through a spin coating process on a side of the support structure 23. Thereafter, the vibrating membrane 21 is processed to fabricate the vibrating membrane 21 as the display assembly substrate 11. Then, a plurality of pixel units 12 are transferred on a side of the vibrating membrane 21 facing away from the support structure 23. Mask material is deposited on a side of the material layer of the support structure 23 facing away from the pixel units 12, and the mask material is photoetched according to a pattern of the cavity 231 to form a mask layer 003. The material layer of the support structure 23 is subjected to a deep etching process through the mask layer 003, to form the cavity 231 and the support structure 23. The motion part 221 of the exciter 22 is brought into contact with a side of the vibrating membrane 21 facing away from the pixel units, and the drive part 222 of the exciter 22 is disposed in the cavity 231. By the foregoing steps, a display panel with a sound generation unit 2 is finally formed.

Optionally, the frequency response of the sound generation unit 2 is closely related to the rigidity of the vibrating membrane 21, and different rigidity of the vibrating membrane 21 may correspondingly optimize audios of different frequencies. If the rigidity of the vibrating membrane 21 is small, the eigenfrequency of the vibrating membrane 21 is low, the low-frequency audio cut-off frequency of the sound generation unit 2 is low, and thus the ductibility of the low-frequency audio generated by the sound generation unit 2 is good. However, if the rigidity of the vibrating membrane 21 is small, when a medium/high-frequency audio is generated, partition vibration would easily occur under the excitation of the medium/high-frequency audio, and a peak or a valley is generated, which would seriously affect the sound quality of medium/high-frequency audio. Therefore, a vibrating membrane 21 of a relatively large rigidity is required for playing medium/high-frequency audio. In this embodiment, the vibrating membrane 21 of the sound generation unit 2 may have different rigidity, and several types of vibrating membranes 21 are described below as examples. In some examples, the vibrating membrane 21 of the sound generation unit 2 may be a flexible substrate. The flexible substrate has a relatively small rigidity and is easy to bend and vibrate under the drive of the exciter 22, thus the sound generation unit 2 of which the vibrating membrane 21 is a flexible substrate is adapted to play low-frequency audio. The sound generation unit 2 with a flexible substrate can expand the cut-off frequency of low-frequency audio, so that low-frequency audio has good sound quality. Thus, the flexible substrate of the vibrating membrane 21 may serve as a low-frequency sound generation unit.

Optionally, when the vibrating membrane 21 is a flexible substrate, the flexible substrate may be made of various types of materials, such as flexible polymers like polyimide, which is not limited herein.

In some examples, the vibrating membrane 21 of the sound generation unit 2 may be a rigid substrate. The rigid substrate has large rigidity and is not easy to bend and vibrate under the drive of the exciter 22, thus a sound generation unit 2 of which the vibrating membrane 21 is a rigid substrate is adapted to play high-frequency audio. A sound generation unit with a rigid substrate can prevent the vibrating membrane 21 from generating partition vibration under the excitation of a medium/high-frequency audio, so that the flatness of high frequency in a frequency response curve can be improved, and meanwhile the cut-off frequency of a medium/high-frequency audio can be increased, the ductibility of medium/high-frequency audio can be improved, thus the sound quality of medium/high-frequency audio is good. Hence, the rigid substrate of the vibrating membrane 21 may serve as a high-frequency sound generation unit.

Optionally, when the vibrating membrane 21 is a rigid substrate, the rigid substrate may be made of various types of materials, for example, the rigid substrate may be a glass substrate, which is not limited herein.

In some examples, a partial region of the vibrating membrane 21 of the sound generation unit 2 is a rigid substrate. In this case, the remaining partial region of the vibrating membrane is a flexible substrate.

Figure 4:
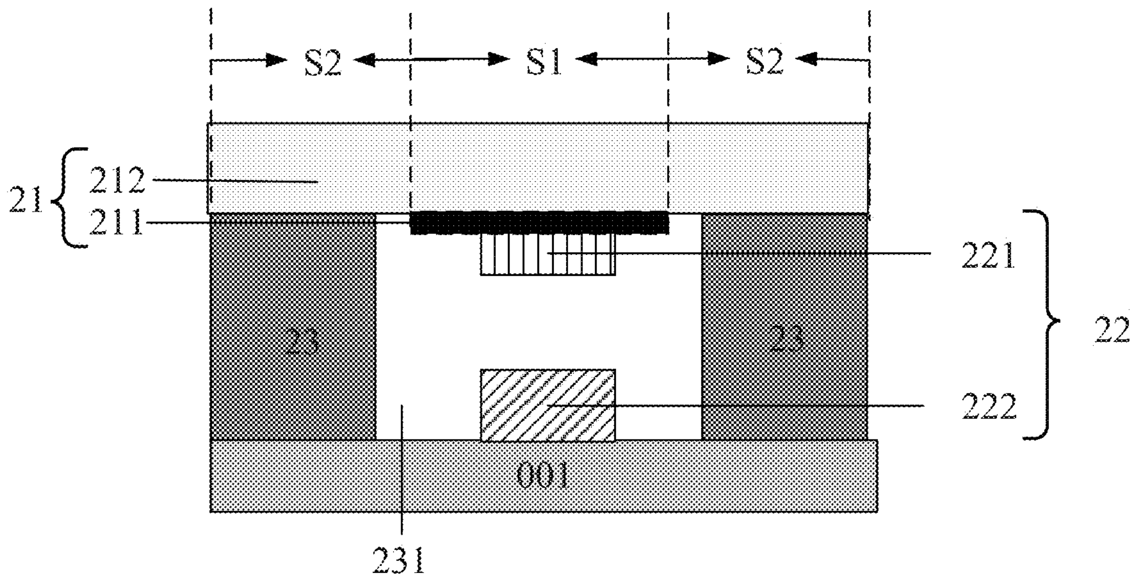
FIG. 4 is an embodiment of a sound generation unit of a display panel according to an embodiment of the present disclosure.

Specifically, referring to FIG. 4, the vibrating membrane 21 includes a flexible substrate layer 212 and an additional layer 211. The additional layer 211 is disposed on a side of the flexible substrate layer 212 close to the support structure 23. An orthographic projection of the additional layer 211 on the flexible substrate layer 212 is located within an orthographic projection of the cavity 231 on the flexible substrate layer 212. In other words, the size of the additional layer 211 is smaller than the size of the opening of the cavity 231. For example, the size of the additional layer 211 may be 0.1 to 0.9 times the size of the opening of the cavity 231.

Optionally, a rigidity of the additional layer 211 is not less than a rigidity of the flexible substrate layer 212, By disposing the additional layer 211 in a partial region of the flexible substrate layer 212, the rigidity of the vibrating membrane 21 in the region where the additional layer 211 is located is increased. Thus, the additional layer 211 and the portion of the flexible substrate layer 212 corresponding to the additional layer 211 together form a rigid substrate of the vibrating membrane 21, while the portion of the flexible substrate layer 212 not corresponding to the additional layer 211 forms a flexible substrate of the vibrating membrane 21. In other words, the vibrating membrane 21 includes a rigid region S1 and a flexible region S2. The rigid region S1 is the additional layer 211 and the portion of the flexible substrate layer 212 corresponding to the additional layer 211. Thus, the rigid region S1 of the vibrating membrane 21 can prevent the vibrating membrane from generating partition vibration under the excitation of medium/high-frequency audio, improve the flatness of high-frequency audio in a frequency response curve, and meanwhile increase the cut-off frequency of high-frequency audio, and improve the ductibility of high-frequency audio. The region of the vibrating membrane 21 not covered by the additional layer 211 is the flexible substrate, i.e. the flexible region S2. Therefore, the flexible region S2 of the vibrating membrane 21 is adapted to play low-frequency audio, and expand the cut-off frequency of low-frequency audio, so that the sound generation unit 2 of this embodiment may be adapted to medium, high, and low-frequency audios.

Optionally, a central axis of the additional layer 211 may be aligned with a central axis of the cavity 231. In other words, the additional layer 211 is disposed in the middle region of the vibrating membrane 21. Only the flexible substrate layer 212 is disposed in an edge region between the additional layer 211 and the cavity 231, since the support structure 23 is in contact with the flexible substrate layer 212, the vibration resistance of the rigid substrate against the vibrating membrane 21 can be reduced.

Optionally, the material of the additional layer 211 may include various types of materials that have a relatively large rigidity, such as metal, and further may be a lightweight metal. For example, the material of the additional layer 211 may include at least one of aluminum and titanium. Of course, the material of the additional layer 211 may also be other materials, which is not limited herein.

Figure 5:
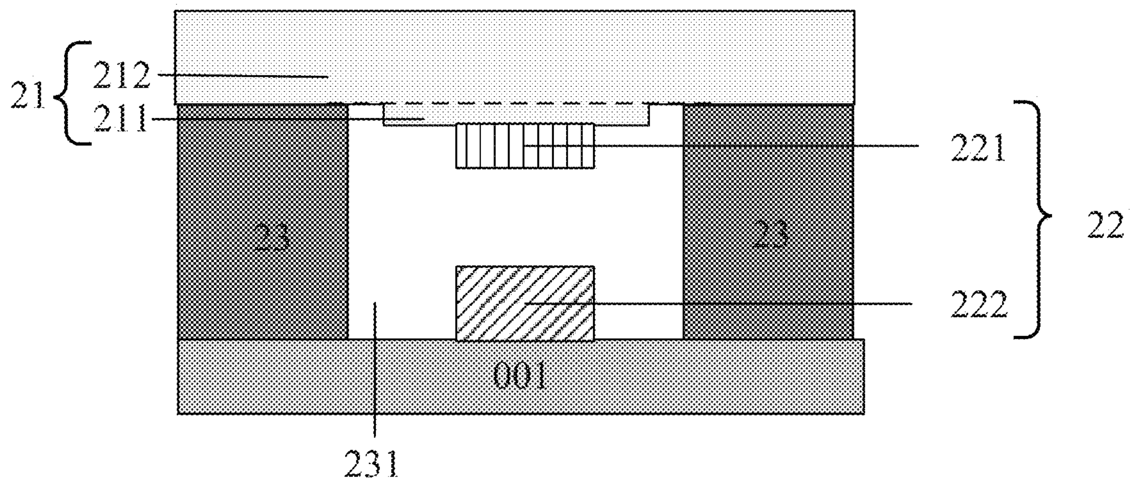
FIG. 5 is an embodiment of a sound generation unit of a display panel according to an embodiment of the present disclosure.

Optionally, as shown in FIG. 5, the additional layer 211 and the flexible substrate layer 212 in the vibrating membrane 21 may be integrally formed. In other words, the additional layer 211 and the flexible substrate layer 212 are formed of the same material and formed in the same process. The flexible substrate layer 212 has a greater thickness in the portion where the additional layer 211 is disposed than the portion where the additional layer 211 is not disposed. The flexible substrate layer 212 has a larger rigidity in the region with the additional layer 211 provided than the region without the additional layer provided. Therefore, the region of the flexible substrate layer 212 where the additional layer 211 is provided is a rigid region S1, which can prevent the vibrating membrane from generating partition vibration under the excitation of a medium/high-frequency audio, improve the flatness of the high-frequency audio in the frequency response curve, and meanwhile increase the cut-off frequency of high-frequency audio, and improve the ductibility of high-frequency audio. The region of the flexible substrate layer 212 where the additional layer is not provided is a flexible region S2, which is adapted to play low-frequency audio and expand the cut-off frequency of the low-frequency audio, thus the sound generation unit 2 of this embodiment may be adapted to medium, high and low-frequency audios.

Figure 7:
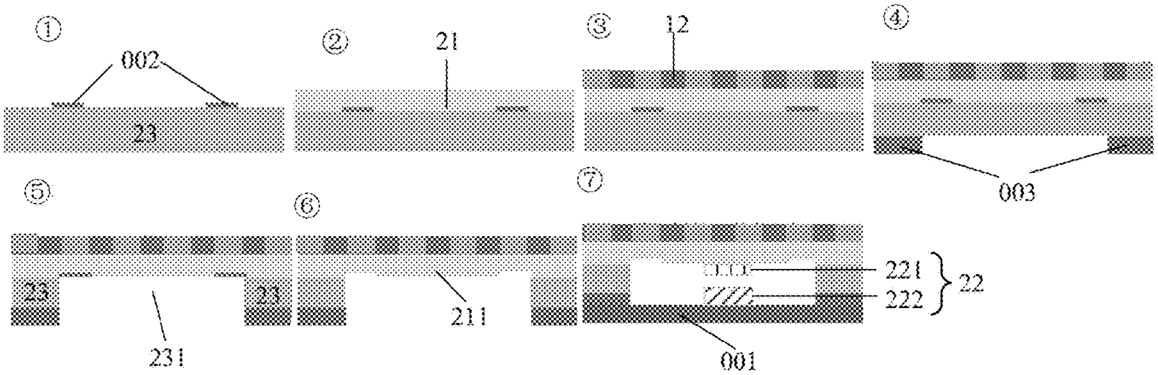
FIG. 7 is a fabricating step diagram of an embodiment of a sound generation unit of a display panel according to an embodiment of the disclosure.

Optionally, FIG. 7 shows a fabricating step diagram of an embodiment of a sound generation unit of the display panel according to an embodiment of the present disclosure, in which embodiment the additional layer 211 and the flexible substrate layer 212 in the vibrating membrane 21 are integrally formed, and the steps are described as follows. In fabricating the sound generation unit 2, a sacrificial layer 002 may be first formed by photoetching on the material layer of the support structure 23 as a substrate according to a pattern of the additional layer 211 (step ① in FIG. 7). Thereafter, the vibrating membrane 21 is fabricated through a spin coating process on the material layer of the support structure 23 (step ②, FIG. 7). Then, a plurality of pixel units 12 are transferred on the vibrating membrane 21 (step ③ in FIG. 7). Then, mask material is deposited on a side of the material layer of the support structure 23 facing away from the pixel units 12, and the mask material is photoetched according to a pattern of the cavity 231 to form a mask layer 003 (step ③ in FIG. 7). Thereafter, the material layer of the support structure 23 is subjected to a deep etching process through the mask layer 003 to form the cavity 231 and the support structure 23 (step ⑤ in FIG. 7), And then, the sacrificial layer 002 is released by deep etching (step ⑥ in FIG. 7), so that the vibrating membrane 21 forms the additional layer 211 and the flexible substrate layer 212, and the additional layer is located on a side of the flexible substrate layer close to the support structure. Finally, the motion part 221 of the exciter 22 is attached to a side of the additional layer 211 facing away from the flexible substrate layer 212, and the drive part 222 is fixed to the base plate 001 (step ⑦ in FIG. 7). Through the above steps, a display panel with a sound generation unit 2 is finally formed. By integrally forming the flexible substrate layer 212 with the additional layer 211, the processing steps can be simplified.

Optionally, the material of the sacrificial layer 002 may be selected from the material having a large difference in corrosion rate from the material of the vibrating membrane 21, such as silicon dioxide (SiO2). The mask layer 003 may be formed of silicon nitride (Si3N4), and the mask layer 003 may be removed by photoetching when fabrication of the sound generation unit 2 is completed. The mask layer 003 may also be retained when fabrication of the sound generation unit 2 is completed, and the mask layer 003 may support the vibrating membrane 21 together with the support structure 23, which is not limited herein.

Figure 6:
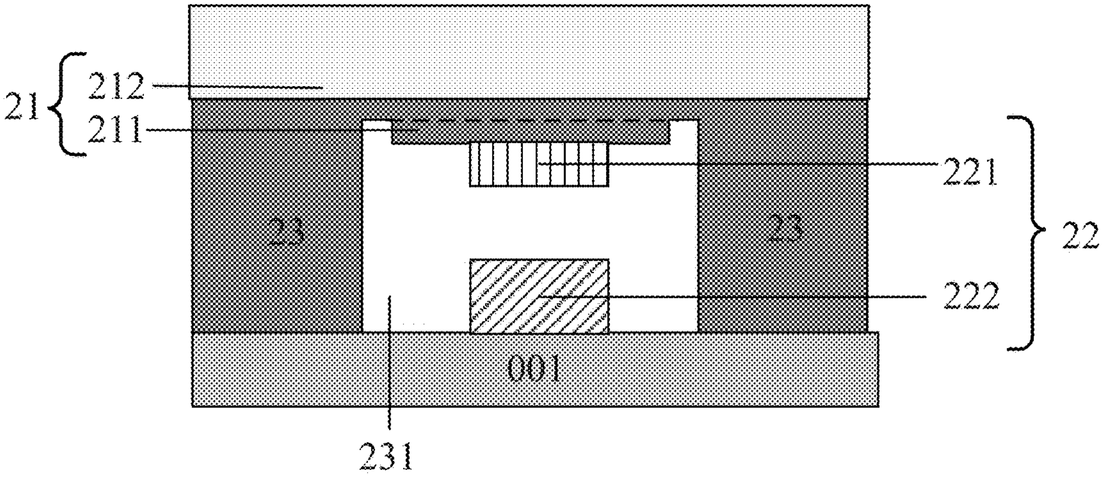
FIG. 6 is an embodiment of a sound generation unit of a display panel according to an embodiment of the present disclosure.

Optionally, as shown in FIG. 6, the additional layer 211 in the vibrating membrane 21 may be integrally formed with the support structure 23. In other words, the additional layer 211 and the support structure 23 are formed of the same material in the same process. Due to large rigidity of the support structure 23, the flexible substrate layer 212 has a larger rigidity in the portion where the additional layer 211 is disposed than the portion where the additional layer 211 is not disposed. In other words, the region with the additional layer 211 provided has a larger rigidity than the region without the additional layer 211 provided. Therefore, the region of the flexible substrate layer 212 where the additional layer 211 is provided is the rigid region S1, which can prevent the vibrating membrane from generating partition vibration under the excitation of medium/high-frequency audio, improve the flatness of high-frequency audio in the frequency response curve, and meanwhile increase the cut-off frequency of high-frequency audio, and improve the ductibility of high-frequency audio. The region of the flexible substrate layer 212 where the additional layer is not provided is the flexible region S2, which is adapted to play low-frequency audio and expand the cut-off frequency of low-frequency audio. Thus, the sound generation unit 2 of this embodiment may be adapted to medium, high, and low-frequency audios.

Figure 8:
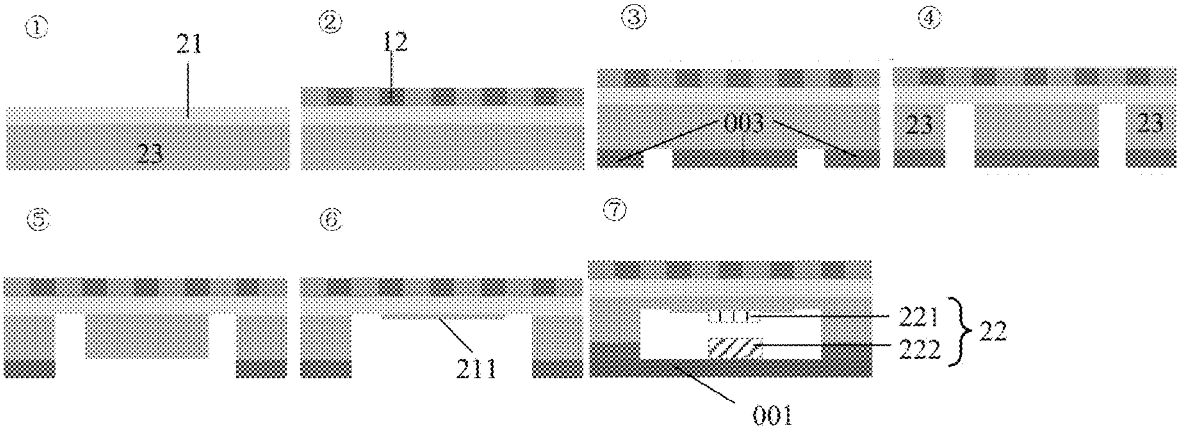
FIG. 8 is a fabricating step diagram of an embodiment of a sound generation unit of a display panel according to an embodiment of the disclosure.

Optionally, FIG. 8 shows a fabricating step diagram of an embodiment of a sound generation unit of the display panel according to an embodiment of the present disclosure, in which embodiment the additional layer 211 in the vibrating membrane 21 and the support structure 23 are integrally formed. In fabricating the sound generation unit 2, the vibrating membrane 21 may be first fabricated through a spin coating process on the material layer of the support structure 23 as a substrate (step ① in FIG. 8). Then, a plurality of pixel units 12 are transferred on the vibrating membrane 21 (step ② in FIG. 8). Then, mask material is deposited on a side of the material layer of the support structure 23 facing away from the pixel units 12, and the mask material is photoetched according to a pattern of the cavity 231 and the additional layer 211 to form a mask layer 003 (step ③ in FIG. 8). Then, the material layer of the support structure 23 is subjected to a deep etching process through the mask layer 003, so that the material layer of the support structure 23 is separated into the support structure 23 at the edge and a middle portion where the additional layer 211 is to be formed (step ④ in FIG. 8). Then, the mask layer 003 on the support structure material of the middle portion is removed by photoetching (step ⑤ in FIG. 8). Thereafter, the support structure material in the middle portion is subjected to deep photoetching to reduce the thickness until the additional layer 211 and the cavity 231 are formed in the middle portion of the material layer of the support structure 23 (step ⑥ in FIG. 8). Finally, the motion part 221 of the exciter 22 is attached to a side of the additional layer 211 facing away from the vibrating membrane 21, and the drive part 222 is fixed to the base plate 001

(step ⑦ in FIG. 8). Through the above steps, a display panel with a sound generation unit 2 is finally formed. By integrally forming the support structure 23 with the additional layer 211, the processing steps can be simplified.

Optionally, the support structure 23 may be a glass substrate. Since the orthographic projection of the cavity 231 on the vibrating membrane 21 is circular, in step ④ of FIG. 8, the groove fir separating the support structure 23 and the additional layer 211 by photoetching is a hole with a circular ring shape which may be etched by Inductively Coupled Plasma (ICP) in step ④, and the material thickness may be reduced by ICP method in step ⑥ to form the additional layer 211.

Optionally, since the support structure 23 is integrally formed with the additional layer 211, when etching the material layer of the support structure 23, the material layer of the support structure 23 may be penetrated due to an excessive etching depth, and thus damaging the flexible substrate layer 212 in the vibrating membrane 21. Hence, an etch stop layer may be provided between the flexible substrate layer 212 and the support structure 23 to protect the vibrating membrane 21 from being damaged. The material of the etch stop layer may be, for example, silicon oxide or silicon nitride.

In some examples, a method of fabricating a display panel includes: fabricating the vibrating membrane 21 on a rigid substrate (serving as a processing substrate) at first, then removing the vibrating membrane 21 from the rigid substrate, fabricating the support structure 23 having the cavity 231 separately, and fixing the vibrating membrane 21 directly to the support structure 23 in a tensioned state.

In some examples, a method for fabricating a display panel includes the following steps. First, an additional material layer is deposited on a processing substrate to form the additional layer 211. Then, the vibrating membrane 21 is fabricated on the processing substrate, and the vibrating membrane 21 is wrapped around the additional layer 211. Then, the vibrating membrane 21 is processed to fabricate the vibrating membrane 21 as the display assembly substrate 11, and a plurality of pixel units 12 are transferred on a side of the vibrating membrane 21 facing away from the processing substrate. The vibrating membrane 21 wrapped around the additional layer 211 is then removed from the processing substrate, and the removed vibrating membrane 21 is fixed on the support structure 23 with the cavity 231 in a tensioned state. Finally, the drive part 222 of the exciter 22 is disposed in the cavity 231, and the motion part 221 of the exciter 22 is attached to a side of the additional layer 211 facing away from the vibrating membrane 21. The drive part 222 drives the motion part 221 to vibrate, and the motion part 221 vibrates to drive the vibrating membrane 21 to vibrate.

Figure 9:
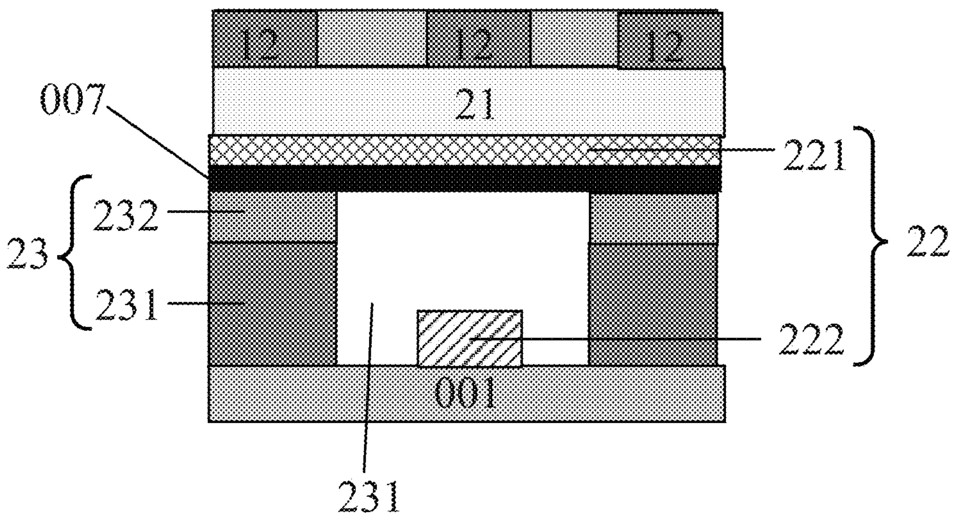
FIG. 9 is a schematic structural diagram of an exciter in a display panel according to an embodiment of the present disclosure, in which a motion part of the exciter is a magnetic film disposed between a vibrating membrane and a support structure.
Figure 10:
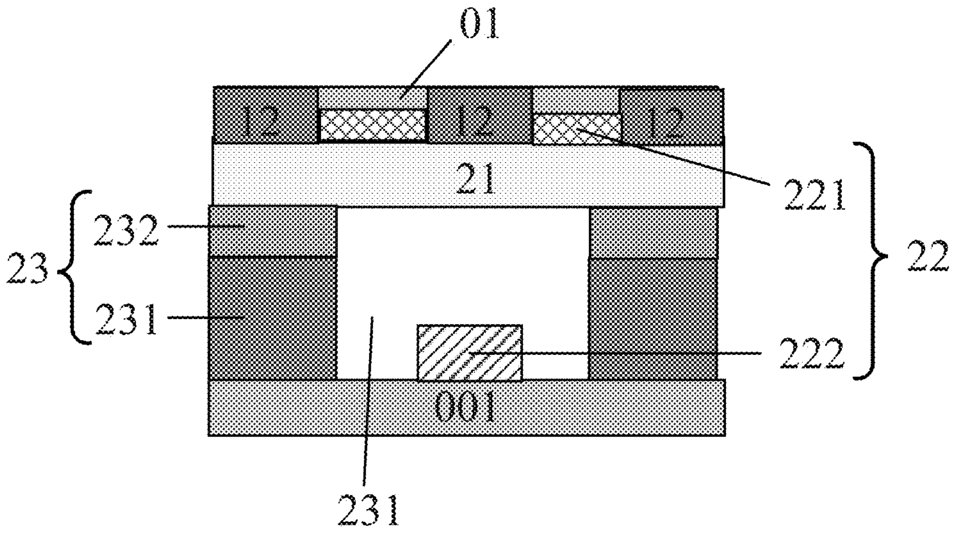
FIG. 10 is a schematic structural diagram of an exciter in a display panel according to an embodiment of the disclosure, in which a motion part of the exciter includes a plurality of magnetic thin films respectively disposed in gaps between pixel units.

As shown in FIGS. 9 and 10, the support structure 23 of the sound generation unit 2 may include a rigid support structure 231 and an elastic support structure 232 that are stacked one on another. The elastic support structure 232 is disposed on a side of the rigid support structure 231 close to the vibrating membrane 21. The elastic support structure 232 is intended to prevent the vibrating membrane 21 from being in hard contact with an inner wall or an edge of the cavity 231 of the support structure 23, thereby preventing hard contact between the vibrating membrane 21 and the inner wall of the cavity 231, so that the generation of large harmonic distortion is avoided, and the sound quality of the sound generation unit 2 can be prevented from being affected. Optionally, the support structure 23 of the sound generation unit 2 may also include a support structure with single rigid.

Optionally, the elastic support structure 232 may be made of a variety of flexible materials, such as foam or optical adhesive that has a low Young's modulus. Of course, the elastic support structure 232 may also be made of other material, which is not limited herein.

Optionally, the support structure 23 of the sound generation unit 2 may also be an elastic support structure. For example, if the sound generation unit 2 is directly adhered to the display assembly 1 by an optical adhesive (OCA), the optical adhesive may serve as the support structure 23 of the sound generation unit 2.

Optionally, the exciter 22 may include a moving coil type electromagnetic exciter or a moving iron type electromagnetic exciter, which is not limited herein. The exciter 22 includes a motion part 221 and a drive part 222, and a central axis of the motion part 221 (the direction from top to bottom in FIG. 1 is the axial direction) may be aligned with a central axis of the cavity 231, so as to precisely drive the vibrating membrane 21 to vibrate.

Optionally, the drive part 222 of the exciter 22 may be a magnet, and the motion part 221 may be a voice coil. The voice coil is disposed at a side of the vibrating membrane 21 close to the magnet, and the voice coil is disposed in the cavity 231. The voice coil may be positioned in a position of the magnet having the strongest magnetic field, and the magnet is intended to drive the voice coil to vibrate, so as to drive the vibrating membrane 21 to vibrate.

Optionally, as shown in FIG. 9, the drive part 222 of the exciter 22 may be a voice coil, and the motion part 221 of the exciter 22 may be a magnetic film. The magnetic film is disposed between the vibrating membrane 21 and the support structure 23, and the magnetic film covers the cavity 231 of the support structure 23. Since the magnetic film is a structure entirely covered under the film layer of the vibrating membrane 21, the magnetic field of the magnetic film can cover the voice coil of the drive part 222, so that the positioning of the motion part 221 relative to the drive part 222 can be omitted, and the process for fabricating the exciter 22 can be simplified.

Optionally, as shown in FIG. 10, in the plurality of pixel units 12, a gap 01 is formed between two adjacent pixel units 12. The drive part 222 of the exciter 22 may be a voice coil, and the motion part 221 of the exciter 22 includes a plurality of magnetic films respectively disposed in the gaps 01 between the pixel units 12. By this arrangement, the magnetic field coverage area of the motion part 221 can be increased, and by disposing the motion part 221 of the magnetic film in the gap 01, the motion part 221 can be prevented from occupying an additional space, and the thickness of the display panel can be reduced.

Optionally, referring to FIGS. 9 and 10, the material of the magnetic film that serves as the motion part 221 of the exciter 22 may include the material having a strong magnetic property such as Neodymium magnet (NdFeB) or ferrite.

Optionally, the plurality of sound generation units 2 in the display panel may include a high-frequency sound generation unit and a low-frequency sound generation unit. The frequency of the audio corresponding to the high-frequency sound generation unit is higher than that of the audio corresponding to the low-frequency sound generation unit. In other words, the high-frequency sound generation unit can improve the ductibility of high-frequency audio, and the low-frequency sound generation unit can improve the ductibility of low-frequency audio. Since the directivity of a sound source increases as the frequency response increases, that is, the directivity of a high-frequency sound source is higher than that of a low-frequency sound, the number of high-frequency sound generation units 2 is larger than that of low-frequency sound generation units 2 in this embodiment, so that the sound generation position of the sound generation units can be controlled more precisely. The low-frequency sound generation unit may be disposed at various positions of the display panel according to application scenarios. For example, the low-frequency sound generation unit may be disposed in a corner and/or edge region or a middle region of the display panel, which is not limited herein.

Optionally, in the sound generation unit according to this embodiment, the sound generation unit 2 may be configured as a high-frequency sound generation unit or a low-frequency sound generation unit in various ways, as exemplified below.

In some examples, the vibrating membrane 21 of the high-frequency sound generation unit is a rigid substrate and the vibrating membrane 21 of the low-frequency sound generation unit is a flexible substrate. Since a rigid substrate can prevent the vibrating membrane from generating partition vibration, improve the flatness of high-frequency audio in the frequency response curve, and meanwhile increase the cut-off frequency of high-frequency audio and improve the ductibility of high-frequency audio, the vibrating membrane 21 of a high-frequency sound generation unit adopts a rigid substrate. Since the flexible substrate can adapt to low-frequency audio and expand the cut-off frequency of low-frequency audio, the vibrating membrane 21 of a low-frequency sound generation unit adopts a flexible substrate.

Figure 11:
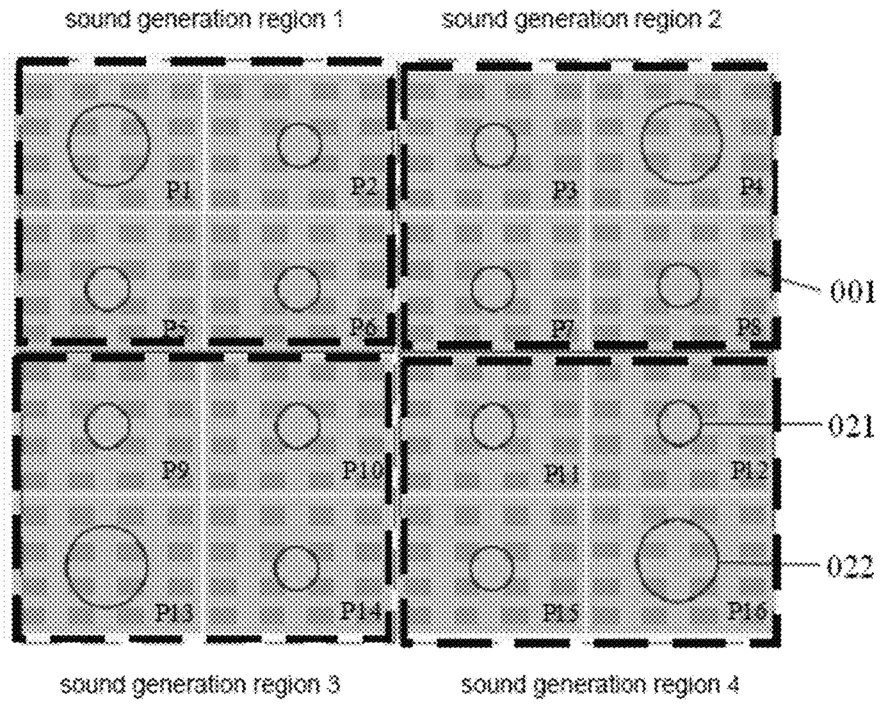
FIG. 11 is a schematic diagram illustrating the distribution of sound generation units in a display panel according to an embodiment of the disclosure.

In some examples, as shown in FIG. 11, an area of an orthographic projection of the cavity 231 of the low-frequency sound generation unit 022 on the vibrating membrane 21 is larger than an area of an orthographic projection of the cavity 231 of the high-frequency sound generation unit 021 on the vibrating membrane 21. By adjusting the size of the cavity 231, the sound generation unit of which the cavity 231 has a large area (low-frequency sound generation unit 022) has a relatively low low-frequency cut-off frequency and is responsible for low-frequency reproduction effects, such as a frequency band of 100-1 kHz. The sound generation unit of which the cavity 231 has a small area (high-frequency sound generation unit 021) has a relatively high low-frequency cutoff frequency and is responsible for medium/high-frequency reproduction effects, such as a frequency band of 10 kHz-15 kHz.

It should be noted that the rigidity of the vibrating membrane 21 of the sound generation unit 2 and the size of the cavity 231 may be adjusted according to a desired audio frequency band, which is not limited herein. Since high-frequency sound generation unit and low-frequency sound generation unit are both disposed in the display panel, the sound generation function of the display panel is suitable for medium, high and low-frequency sound sources simultaneously, thus the sound quality can be improved significantly.

Figure 12:
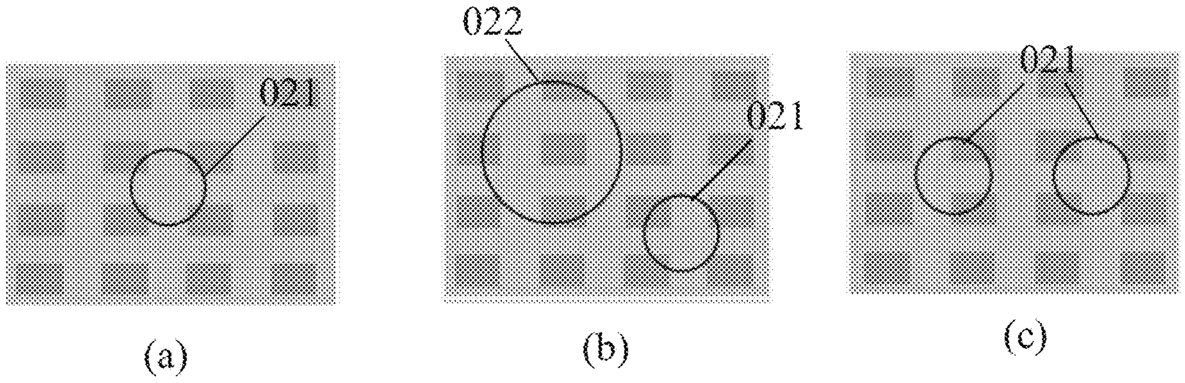
FIG. 12 is a schematic diagram illustrating the distribution of sound generation units on a sub-panel of a display panel according, to an embodiment of the present disclosure.

Optionally, referring to FIG. 11, the display panel may include a plurality of sub-panels (e.g., P1 . . . P16 in FIG. 11), that is, the display panel adopts a spliced screen, that is, to splice a plurality of sub-panels into a whole to form the entire display panel, and at least some sub-panels have at least one sound generation unit 2. As shown in FIG. 12, any number of sound generation units 2 may be disposed on one sub-panel, and the sound generation units 2 may be high-frequency sound generation units 021 or low-frequency sound generation units 022, or both. For example, one high-frequency sound generation unit 021 may be disposed on the sub-panel (as shown in FIG. 12(*a*)), or one high-frequency sound generation unit 021 and one low-frequency sound generation unit 022 may be disposed on the sub-panel along a diagonal line (as shown in FIG. 12(*b*)), or two high-frequency sound generation units 021 may be disposed side by side on the sub-panel (as shown in FIG. 12(*c*)), and the specific arrangement may be determined as required, which is not limited herein.

Figure 13:
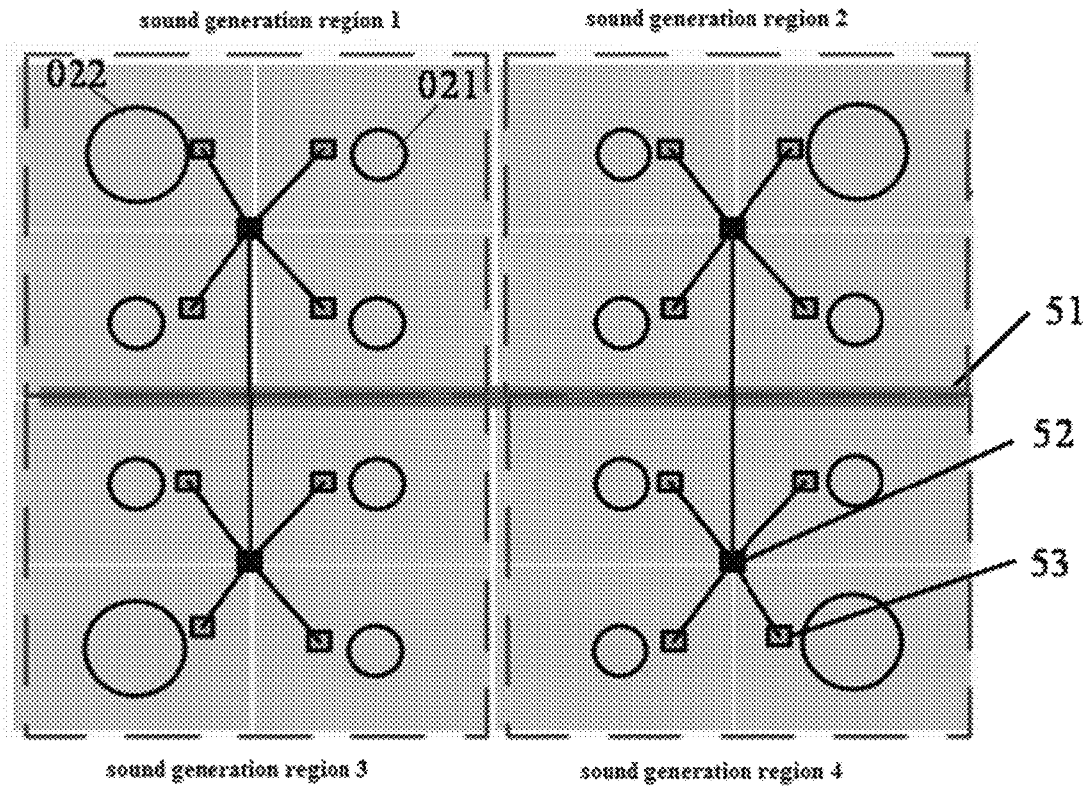
FIG. 13 is a schematic diagram illustrating the connection of the respective control chips of sound generation units of a display panel according to an embodiment of the present disclosure.

In some examples, as shown in FIGS. 11 and 13, the display panel may include a plurality of sound generation regions (e.g., sound generation regions 1-4 in FIG. 11). If the display panel includes a plurality of sub-panels, each sound generation region may include any number of sub-panels. FIG. 11 illustrates an example where one sound generation region includes four sub-panels. Each sound generation region is provided with a plurality of sound generation units 2, and the plurality of sound generation units 2 in each sound generation region may include at least one of the high-frequency sound generation unit 2 and the low-frequency sound generation unit 2. The specific division of the sound generation region may be set according to application scenarios, which is not limited herein.

Optionally, as shown in FIG. 13, the display panel further includes an audio input control chip 51, and the display panel includes a plurality of sound generation regions each having a region control chip 52. Each sound generation unit 2 is connected to one sound generation unit control chip 53, and the sound generation unit control chips 53 corresponding to the plurality of sound generation units 2 in each sound generation region are connected to the same region control chip 53. The region control chips 53 corresponding to the plurality of sound generation regions are collectively connected to the audio input control chip 51. When the display panel is to generate a sound, the audio input control chip 51 determines a sound generation region that is to generate a sound, and inputs an audio signal into a region control chip 52 corresponding to the sound generation region that is to generate a sound, and after the audio signal is processed (high-frequency filtered or low-frequency filtered) by the region control chip 52 according to the type of the sound generation unit 2 (high-frequency sound generation unit or low-frequency sound generation unit), the audio signal is input into the sound generation unit control chip 53 of a corresponding sound generation unit 2, and the sound generation unit control chip 53 controls the corresponding sound generation unit 2 to generate a sound.

Optionally, when sound generation assemblies are disposed in each of the plurality of sound generation regions, the high-frequency sound generation assembly and the low-frequency sound generation assembly may also be other types of sound generation assemblies, such as speaker, and the like, which is not limited herein.

Optionally, the audio input control chip 51 may determine a sound generation region that is to generate a sound in various ways. For example, the audio input control chip 51 max determine a sound generation region by audio-video synchronization technique. For example, the display panel is playing a basketball game, the sound source target is positioned to the basketball, and the audio input control chip 51 determines the sound generation region that is to generate a sound according to the sound generation region of the sound generation unit 2 to which the pixel unit 12 corresponding to the movement position of the basketball on the display panel belongs, so as to realize the function that the position of the sound source follows the movement of the sound source target (for example, the basketball) and changes the sound generation position, namely, realize the audio-video synchronization function.

Optionally, the sound generation unit control chip 53 is connected to the region control chip 52 through a connection line. The connection lines in the same sound generation region have the same length, so as to ensure that the loads on the connection lines are the same, and further ensure consistency of audio signals received by the respective sound generation units 2.

Figure 14:
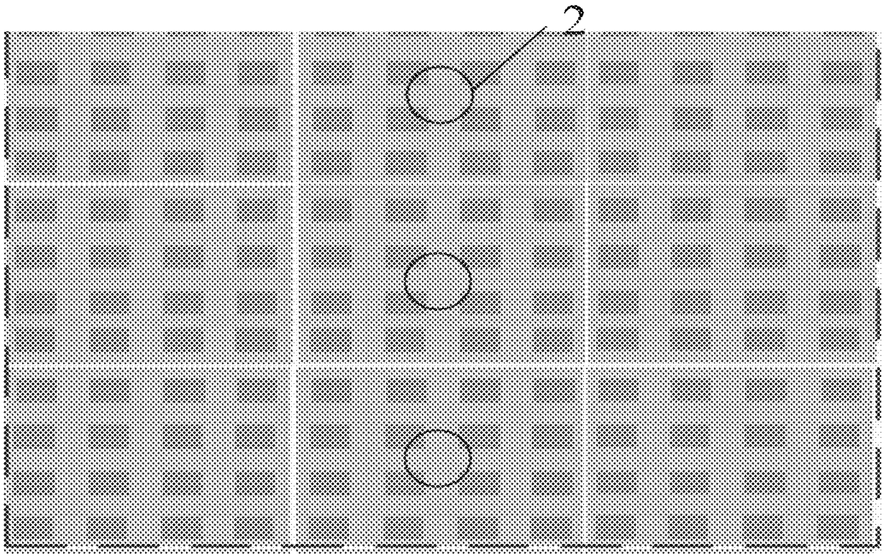
FIG. 14 is a layout diagram of sound generation units on a display panel according to an embodiment of the present disclosure, in which the sound generation units are disposed linearly on a base plate.

Optionally, the plurality of sound generation units 2 are arranged on the base plate 001 in various ways. For example, as shown in FIG. 14, the sound generation units 2 may be linearly disposed on the base plate 001. In other words, one or more columns (one or more rows) of adjacent sound generation units 2 are disposed on the base plate 001. By arranging the sound generation units 2 on base plate 001 linearly, when a plurality of sound generation units 2 generate sound simultaneously, the sound waves would interfere with each other to form a cylindrical wave, and the cylindrical wave has a sound attenuation point that has a longer distance as compared to a spherical wave generated by a single sound source, so that sound attenuation can be reduced.

Figure 15:
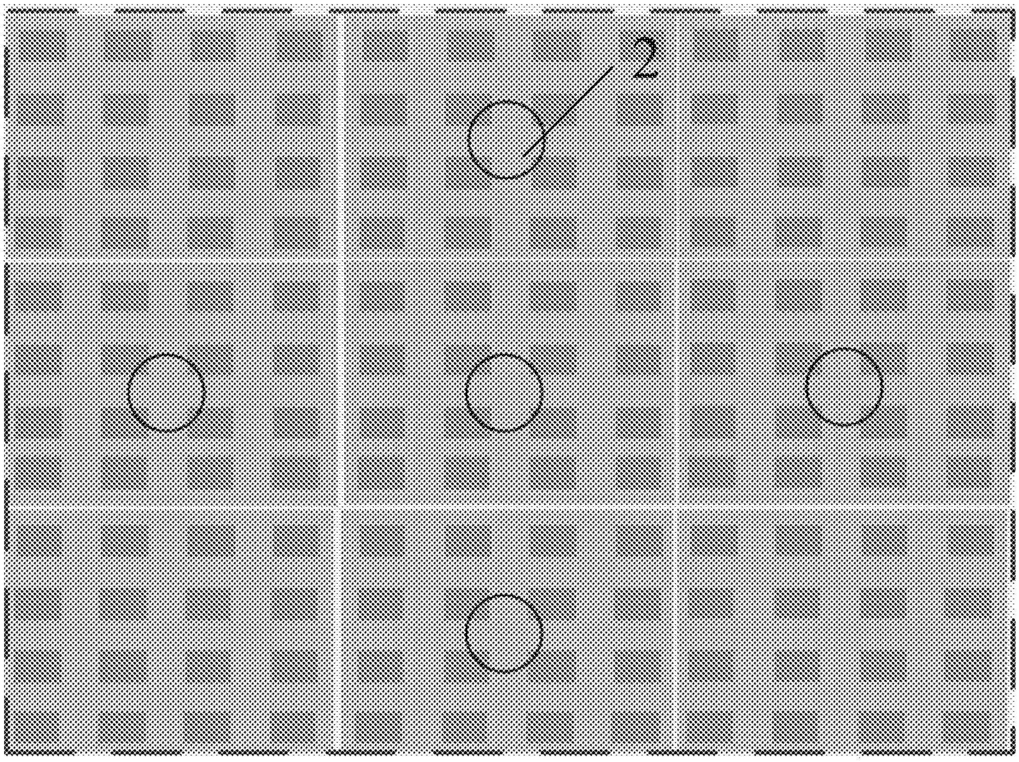
FIG. 15 is a layout diagram of sound generation units on a display panel according to an embodiment of the present disclosure, in which the sound generation units are arranged in a cross-shaped array on a base plate.

Optionally, as shown in FIG. 15, a plurality of sound generation units 2 are disposed in a cross-shaped array on the base plate 001. In other words, on the base plate 001, one or more rows of adjacent sound generation units 2 are disposed to intersect vertically with one or more columns of adjacent sound generation units 2. By arranging the sound generation unit 2 in a cross-shaped array on base plate 001, when a plurality of sound generation units 2 generate sound simultaneously, the sound waves would interfere with each other to form a sound wave similar to planar wave, and the planar wave has a sound attenuation point that has a longer distance as compared to a spherical wave generated by a single sound source, so that sound attenuation can be further reduced.

Correspondingly, this embodiment also provides a display device including the display panel described above. The display device may include various types, such as an organic electroluminescent (OLED) display device. The display device may be any product or component with a display function, such as a mobile phone, a tablet computer, a television, a display, a notebook computer, a digital photo frame, a navigator or the like. Other essential components of the display device are understood by those skilled in the art, and are not described herein nor should they be construed as limiting the present disclosure.

It should be understood that above embodiments are just examples for illustrating the principle of the invention, however, the invention is not limited thereto. Various modifications and variations can be made by a person skilled in the art without departing from the spirit and the scope of the present invention. These modifications and variations should be considered to be within protection scope of the present invention.

What is claimed is:

1. A display panel, comprising:

a display assembly and a plurality of sound generation assemblies;

wherein the display assembly comprises a display assembly substrate and a plurality of pixel components disposed on a side of the display assembly substrate;

wherein each of the plurality of sound generation assemblies comprises a vibrating membrane, an exciter and a support structure;

wherein the support structure is disposed on a side of the vibrating membrane and has a cavity;

wherein the exciter comprises a motion part in contact with the vibrating membrane and a drive part disposed in the cavity, the drive part drives the motion part to vibrate, and the motion part vibrates to drive the vibrating membrane to vibrate; and wherein the display assembly substrate and the vibrating membrane are the same structure, and the plurality of pixel components are disposed on a side of the vibrating membrane facing away from the support structure.

2. The display panel of claim 1, wherein a partial region of the vibrating membrane is a rigid substrate, and a remaining partial region of the vibrating membrane is a flexible substrate.

3. The display panel of claim 2, wherein the vibrating membrane comprises a flexible substrate layer and an additional layer; wherein, the additional layer is disposed on a side of the flexible substrate layer close to the support structure, and when viewed in a direction from the vibrating membrane to the support structure, a projection of the additional layer on the flexible substrate layer is positioned within a projection of the cavity on the flexible substrate layer; and wherein a rigidity of the additional layer is not less than a rigidity of the flexible substrate layer, and the partial region of the vibrating membrane is configured such that the additional layer and a portion of the flexible substrate layer corresponding to the additional layer together form the rigid substrate.

4. The display panel of claim 3, wherein the additional layer is integrally formed with the flexible substrate layer; or the additional layer is integrally formed with the support structure.

5. The display panel of claim 1, wherein the vibrating membrane is a flexible substrate; or the vibrating membrane is a rigid substrate.

6. The display panel of claim 1, wherein the support structure comprises a rigid support structure and an elastic support structure, and wherein the elastic support structure is disposed on a side of the rigid support structure close to the vibrating membrane.

7. The display panel of claim 1, wherein the drive part is a magnet, the motion part is a voice coil disposed on a side of the vibrating membrane close to the magnet, and the voice coil is disposed in the cavity.

8. The display panel of claim 1, wherein the drive part is a voice coil, the motion part is a magnetic film disposed between the vibrating membrane and the support structure, and the magnetic film covers the cavity.

9. The display panel of claim 1, wherein in the plurality of pixel units, a gap is formed between two adjacent pixel units; and the drive part is a voice coil, and the motion part comprises a plurality of magnetic films each disposed in the gap.

10. The display panel of claim 1, wherein the plurality of sound generation assemblies comprise at least one high-frequency sound generation assembly and at least one low-frequency sound generation assembly, and a frequency of an audio corresponding to the high-frequency sound generation assembly is higher than a frequency of an audio corresponding to the low-frequency sound generation assembly; and wherein the number of the high-frequency sound generation assembly is larger than the number of the low-frequency sound generation assembly.

11. The display panel of claim 10, wherein the vibrating membrane of the high-frequency sound generation assembly is a rigid substrate, and the vibrating membrane of the low-frequency sound generation assembly is a flexible substrate.

12. The display panel of claim 10, wherein when viewed in the direction from the vibrating membrane to the support structure, an area of a projection of the cavity of the low-frequency sound generation assembly on the vibrating membrane is larger than an area of a projection of the cavity of the high-frequency sound generation assembly on the vibrating membrane.

13. The display panel of claim 1, wherein the display panel comprises a plurality of sound generation regions each provided with a plurality of sound generation assemblies, and each of the plurality of sound generation assemblies in each of the plurality of sound generation regions comprises at least one of the high-frequency sound generation assembly and the low-frequency sound generation assembly.

14. The display panel of claim 13, wherein the display panel further comprises an audio input control chip;

wherein each of the plurality of sound generation regions is connected to a region control chip, and each of the plurality of sound generation assemblies is connected to a sound generation assembly control chip; wherein in each of the plurality of sound generation regions, the sound generation assembly control chip corresponding to each of the plurality of sound generation assemblies is connected to the region control chip of said sound generation region;

wherein the region control chip corresponding to each of the plurality of sound generation regions is connected to the audio input control chip; and wherein the audio input control chip inputs an audio signal into the region control chip corresponding to the sound generation region that is to generate a sound, and after the region control chip processes the audio signal according to a type of the sound generation assembly, the region control chip inputs a processed audio signal into a sound generation assembly control chip of a corresponding sound generation assembly.

15. The display panel of claim 1, wherein the display panel further comprises a base plate on which a plurality of the sound generation assemblies are arranged linearly or in a cross-shaped array.

16. A display device, comprising the display panel of claim 1.

17. A method for fabricating a display panel, comprising:

fabricating a vibrating membrane on a side of a support structure through a spin coating process;

processing the vibrating membrane to fabricate the vibrating membrane as a display assembly substrate;

transferring a plurality of pixel components on a side of the vibrating membrane facing away from the support structure;

depositing mask material on a side of a material layer of the support structure facing away from the vibrating membrane, and photoetching the mask material according to a pattern of a cavity to form a mask layer;

performing deep etching processing on the material layer of the support structure from a side of the support structure facing away from the vibrating membrane, so as to form the support structure and a cavity of the support structure; and disposing an exciter including a drive part and a motion part such that the drive part is disposed in the cavity, the motion part is in contact with the vibrating membrane, wherein the drive part drives the motion part to vibrate, and the motion part vibrates to drive the vibrating membrane to vibrate.

18. The method of claim 17, further comprising:

before fabricating the vibrating membrane on the support structure, depositing sacrificial layer material on the material layer of the support structure and performing photoetching to form a sacrificial layer; and after processing the material layer of the support structure to form the cavity, performing deep etching to release the sacrificial layer, so that the vibrating membrane forms a flexible substrate layer and an additional layer, and the additional layer is positioned on a side of the flexible substrate layer close to the support structure, wherein the motion part is attached to a side of the additional layer facing away from the flexible substrate layer.

19. The method of claim 17, wherein, in the step of forming the mask layer, the mask material is photoetched according to a pattern of the cavity and the additional layer, and, wherein in the step of forming the support structure and the cavity of the support structure, a material layer of the support structure is first deep etched through a mask layer, so that the material layer of the support structure is divided into the support structure positioned at an edge and a middle portion in which the additional layer is to be formed, then the mask layer on the middle portion of the material layer of the support structure is removed by photoetching, and then the middle portion of the material layer of the support structure is subjected to deep photoetching to reduce a thickness until the additional layer and the cavity are formed in the middle portion of the material layer of the support structure, and wherein the motion part is attached to a side of the additional layer facing away from the vibrating membrane.

20. A control method of a display panel for controlling the display panel of claim 14; wherein, the control method comprises:

inputting, by the audio input control chip, an audio signal into the region control chip corresponding to the sound generation region that is to generate a sound;

and after the audio signal is processed, inputting, by the region control chip, a processed audio signal into a sound generation assembly control chip of a corresponding sound generation assembly.

* * * * *